(12) United States Patent
Zlotnick

(10) Patent No.: US 7,499,602 B2
(45) Date of Patent: Mar. 3, 2009

(54) EFFICIENCY AND SPEED IN VERIFICATION OF RECOGNITION RESULTS

(75) Inventor: Aviad Zlotnick, Mizpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 1518 days.

(21) Appl. No.: 09/902,733

(22) Filed: Jul. 12, 2001

(65) Prior Publication Data

US 2003/0012459 A1   Jan. 16, 2003

(51) Int. Cl.
*G06K 9/03* (2006.01)

(52) U.S. Cl. ............... 382/311; 345/163; 345/173; 345/179; 382/180; 382/189; 382/321; 715/225; 715/243; 715/763; 715/767

(58) Field of Classification Search ........ 345/157, 345/161, 163, 167, 173, 179, 180, 764, 773, 345/780; 382/119, 177, 187, 188, 189, 309, 382/311, 313, 314, 315, 317, 321, 173, 175, 382/180, 282; 715/505, 506, 507, 508, 509, 715/529, 531, 534, 539, 541, 511, 221, 224, 715/225, 243, 763, 767; 358/453; 707/3
See application file for complete search history.

(56) References Cited

U.S. PATENT DOCUMENTS

| | | | | |
|---|---|---|---|---|
| 5,315,667 A | * | 5/1994 | Fujisaki et al. | 382/187 |
| 5,455,875 A | | 10/1995 | Chevion et al. | |
| 5,455,901 A | * | 10/1995 | Friend et al. | 715/507 |
| 5,544,260 A | * | 8/1996 | Chefalas et al. | 382/187 |
| 5,566,248 A | * | 10/1996 | Ulrich | 382/187 |
| 5,666,490 A | * | 9/1997 | Gillings et al. | 709/238 |
| 5,677,710 A | * | 10/1997 | Thompson-Rohrlich | 345/173 |
| 5,682,439 A | * | 10/1997 | Beernink et al. | 382/187 |
| 5,717,794 A | * | 2/1998 | Koga et al. | 382/309 |
| 5,721,940 A | * | 2/1998 | Luther et al. | 715/506 |
| 5,732,152 A | * | 3/1998 | Sakai et al. | 382/189 |
| 5,806,079 A | * | 9/1998 | Rivette et al. | 715/210 |
| 5,881,381 A | * | 3/1999 | Yamashita et al. | 715/509 |
| 5,950,190 A | * | 9/1999 | Yeager et al. | 707/3 |
| 6,014,677 A | * | 1/2000 | Hayashi et al. | 707/104.1 |
| 6,016,478 A | * | 1/2000 | Zhang et al. | 705/9 |
| 6,046,740 A | * | 4/2000 | LaRoche et al. | 715/764 |
| 6,055,327 A | * | 4/2000 | Aragon | 382/138 |
| 6,167,411 A | * | 12/2000 | Narayanaswamy | 715/541 |
| 6,282,315 B1 | * | 8/2001 | Boyer | 382/177 |
| 6,351,574 B1 | * | 2/2002 | Yair et al. | 382/321 |
| 6,393,138 B1 | * | 5/2002 | Chai | 382/119 |
| 6,628,832 B2 | * | 9/2003 | Kanatsu | 382/173 |
| 6,647,156 B1 | * | 11/2003 | Meding | 382/305 |
| 6,650,346 B1 | * | 11/2003 | Jaeger et al. | 345/764 |
| 6,654,031 B1 | * | 11/2003 | Ito et al. | 345/723 |
| 6,658,622 B1 | * | 12/2003 | Aiken et al. | 715/507 |
| 6,674,901 B1 | * | 1/2004 | Simske et al. | 382/180 |
| 6,727,917 B1 | * | 4/2004 | Chew et al. | 345/765 |

(Continued)

*Primary Examiner*—Gregory M Desire
(74) *Attorney, Agent, or Firm*—Browdy and Neimark, P.L.L.C.

(57) ABSTRACT

A method for increasing efficiency of interaction by an operator with data on a computer display includes presenting the data to the operator on the computer display, and providing multiple instances of an on-screen control at different locations on the display for selection by the operator using a pointing device linked to the display. The control is actuated responsive to the selection by the operator of any of the instances of the control on the display.

30 Claims, 3 Drawing Sheets

U.S. PATENT DOCUMENTS

| | | | |
|---|---|---|---|
| 6,760,490 B1 * | 7/2004 | Zlotnick | 382/311 |
| 6,760,755 B1 * | 7/2004 | Brackett | 709/214 |
| 6,922,699 B2 * | 7/2005 | Schuetze et al. | 707/103 R |
| 2002/0156657 A1 * | 10/2002 | de Grosz et al. | 705/4 |

* cited by examiner

EFFICIENCY AND SPEED IN VERIFICATION OF RECOGNITION RESULTS

FIELD OF THE INVENTION

The present invention relates generally to data encoding and specifically to methods and apparatus for improving the efficiency of data input to a computer.

BACKGROUND OF THE INVENTION

There are many applications for data input from a hard copy to a computer system that use automated Optical Character Recognition (OCR), followed by manual verification of the OCR results. Often, the computer that performs the OCR also generates a confidence rating for its reading of each character or group of characters. Human operators perform the verification step, either by reviewing all the fields in the original document, and correcting errors and rejects discovered in the OCR results, or by viewing and correcting only the characters or fields that have a low OCR confidence level.

There are methods known in the art for improving the reliability of the verification step. For example, U.S. Pat. No. 5,455,875, to Chevion et al., whose disclosure is incorporated herein by reference, describes a method for organizing data on a computer screen so as to improve productivity of human operators in verifying OCR results. The method is implemented in document processing systems produced by IBM Corporation (Armonk, N.Y.), in which the method is referred to as "SmartKey."

SmartKey works by presenting to the human operator a "carpet" of character images on the screen of a verification terminal. The character images are taken by segmenting the original document images that were processed by OCR. Segmented characters from multiple documents are sorted according to the codes assigned to them by the OCR. The character images are then grouped and presented in the carpet according to their assigned code. Thus, for example, the operator might be presented with a carpet of characters that the OCR has identified as representing the letter "a." Under these conditions, it is relatively easy for the operator to visually identify OCR errors, such as a handwritten "o" that was erroneously identified as an "a." The operator marks erroneous characters by clicking on them with a mouse, and then typically presses a "done" or "enter" button.

The displaying of composite, "carpet" images to the operator, made up entirely of characters which have been recognized by the OCR logic as being of the same type, enables errors to be rapidly recognized and marked on an exception basis. Once recognized, these errors can then be corrected either immediately or sent to another operator for correction, along with characters rejected by the OCR logic. The remaining, unmarked characters in the carpet are considered to have been verified.

SUMMARY OF THE INVENTION

Even in productivity-enhancing verification systems, such as SmartKey, there is a built-in inefficiency, in that it has been found to take the operator around 30-50% of the total verification time to move the cursor in between the characters and the "done" button. Preferred embodiments of the present invention provide methods and systems for overcoming this inefficiency, thus increasing the speed of verification of coding of information, particularly coding of characters in form documents by OCR.

In preferred embodiments of the present invention, a system for verification of coding of information is provided, wherein multiple "done" or "enter" buttons appear on the computer screen at different locations. The distance on the screen between an image of an item to be verified and the nearest button is thus significantly reduced. The "done" buttons are preferably interspersed between or around the items for verification. For example, in the particular case of processing SmartKey carpets, the "done" buttons are preferably incorporated into the grid of fields containing individual characters to be verified. Thus, the operator need make only a small movement of a mouse or other pointing device in order to bring the cursor to the nearest "done" button. Clicking on any such button indicates that the operator's interaction with this screen is completed.

Although preferred embodiments described herein relate specifically to placement of a "done" or "enter" button for use in data verification, the principles of the present invention are equally applicable to on-screen controls and user tasks of other types. Those skilled in the art will appreciate that duplication of such controls at multiple locations on the computer screen can enhance the speed and efficiency of data processing in a variety of applications. Although particular types, arrangements and locations of on-screen controls are described herein by way of example, alternative arrangements will be apparent to those skilled in the art, depending on the specific workflow pattern of a given system. For example, a system comprising multiple buttons on a display screen can be used for data entry/input. Each time an operator finishes inputting data in one field, he presses the nearest "done" button. This, saves much time in data entry. Similarly, in optical inspection systems, the multiple buttons on the display screen can be used to accept or reject an inspected item.

There is therefore provided, in accordance with a preferred embodiment of the present invention, a method for increasing efficiency of interaction by an operator with data on a computer display, including:

presenting the data to the operator on the computer display;

providing multiple instances of an on-screen control at different locations on the display for selection by the operator using a pointing device linked to the display; and actuating the control responsive to the selection by the operator of any of the instances of the control on the display.

Preferably, actuating the control includes receiving an input from the operator to indicate that the data are verified.

Further preferably, presenting the data includes presenting the data in a plurality of data fields on the display, and providing the multiple instances includes placing the instances of the control in proximity to different ones of the fields. Typically, the on-screen control indicates that the operator has finished processing the data in the plurality of the fields. Preferably, placing the instances includes interspersing the instances of the control between the data fields, wherein providing the multiple instances includes choosing the locations so as to minimize a traverse of the pointing device required to select one of the instances.

In a preferred embodiment, presenting the data includes displaying in the fields characters from a document to which codes have been assigned so that the operator can verify that the assigned codes are correct. Preferably, displaying the characters includes displaying results of optical character recognition (OCR) processing. Most preferably, displaying the results includes displaying together a plurality of the characters which have been assigned the same code by the OCR processing, with one of the characters in each of the fields.

Preferably, providing the multiple instances includes providing three or more instances of the control on screen.

There is also provided, in accordance with a preferred embodiment of the present invention, apparatus for operator interaction with a computer, including:

a display, arranged to present data to an operator;

a processor, coupled to drive the display to present the data together with multiple instances of an on-screen control at different locations on the display; and a pointing device, coupled to the processor so as to enable the operator to select for actuation any of the instances of the on-screen control by the operator.

Preferably, selection of any of the instances of the on-screen control indicates that the data are verified.

There is further provided, in accordance with a preferred embodiment of the present invention, a computer software product for increasing efficiency of interaction of an operator with data on a computer display, including a computer-readable medium in which program instructions are stored, which instructions, when read by a computer, cause the computer to present the data to the operator on the computer display while providing multiple instances of an on-screen control at different locations on the display for selection by the operator using a pointing device linked to the display, and to actuate the control responsive to the selection by the operator of any of the instances of the control on the display.

The present invention will be more fully understood from the following detailed description of the preferred embodiments thereof, taken together with the drawings, in which:

DETAILED DESCRIPTION OF PREFERRED EMBODIMENTS

Figure 1:
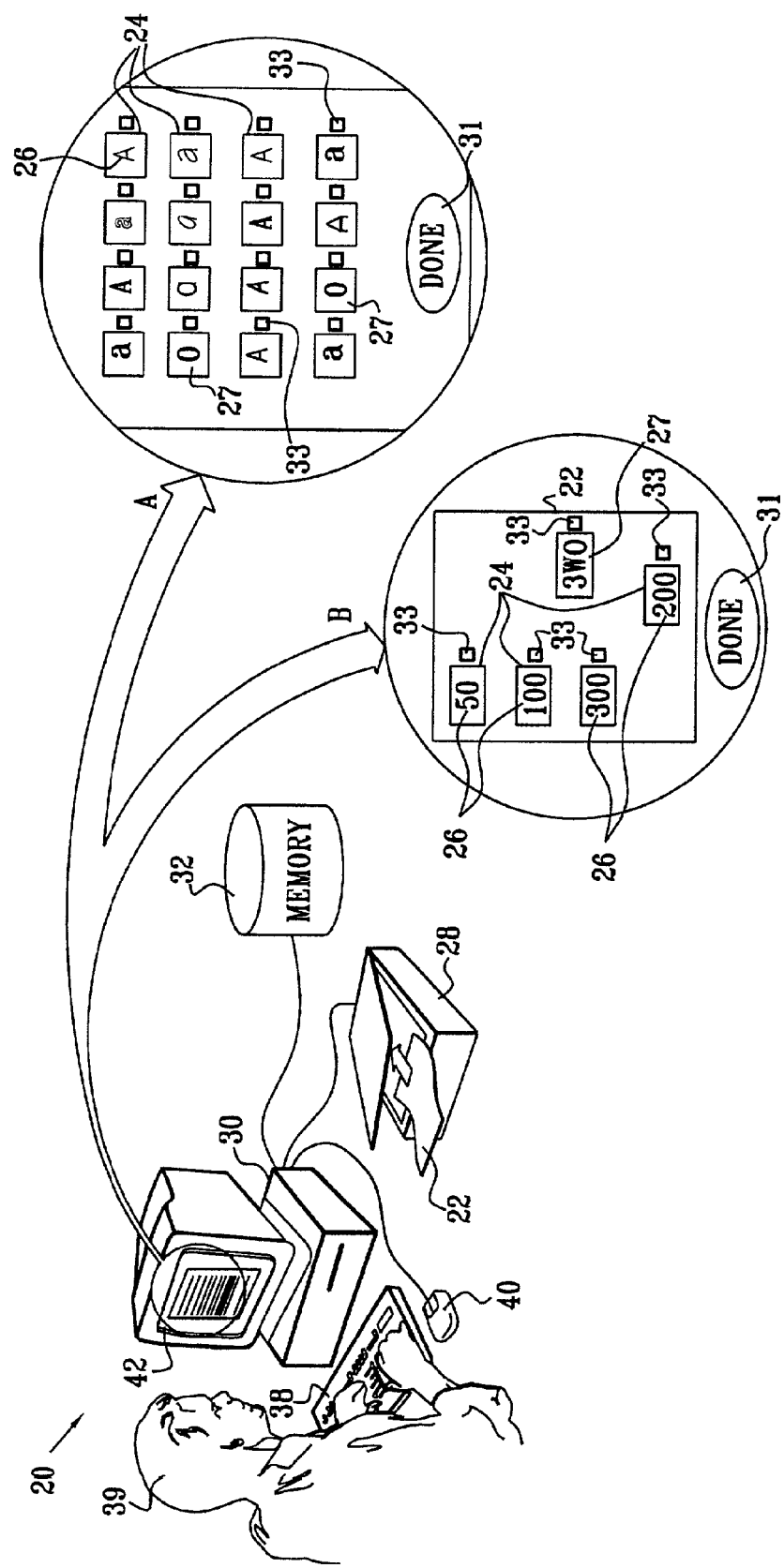
FIG. 1 is a simplified pictorial illustration showing a system for verification of coding of information, in accordance with a preferred embodiment of the present invention.

FIG. 1 is a simplified pictorial illustration showing a system 20 for verification of coding of information, in accordance with a preferred embodiment of the present invention. System 20 receives a document 22 for extraction of information therefrom. The document preferably comprises a preprinted form having fields 24 that are filled in with handwritten, typed or printed contents 26. The contents typically comprise alphanumeric characters, although they may comprise symbols or marks of other types, generated by hand or by machine.

A scanner 28 first captures an image of document 22 and conveys the corresponding image data to a document processor 30, typically comprising a suitable general-purpose computer. In order to extract information from document 22, system 20 performs OCR on the image data, and thus assigns a code (such as an ASCII code) to each character. Alternatively, the document is input to the processor from another source, typically in electronic form, either as a document image or as characters keyed in by an operator. Further alternatively, although the methods described hereinbelow are applied specifically to verification of OCR characters, the principles of these methods are applicable to verification of data coding of substantially any type.

The OCR and verification functions of processor 30 (typically together with other document processing functions) are preferably performed using software running on processor 30. The software may be supplied on tangible media, such as diskettes or CD-ROM, and loaded into the processor. Alternatively, the software may be downloaded to the processor via a network connection or other electronic link. Further alternatively, processor 30 may comprises dedicated, hard-wired elements or a digital signal processor designed to carry out some or all of the processing functions.

Typically, processor 30 retrieves items from memory 32 and presents them on a screen 42 for verification by an operator 39. An item may be an alphanumeric character, a symbol or any other object requiring verification. More typically, the items are characters all having the same code, and requiring operator verification, as in the IBM SmartKey system, described in the Background of the Invention. Processor 30 typically allows the operator to process a screen full of items.

Operator 39 views multiple items simultaneously on screen 42, and identifies any anomalous item appearing on the screen. In the example of FIG. 1, as shown in the inset at upper right, the operator views a SmartKey "carpet" of characters 26, all of which were coded by processor 30 (or by another processor or operator) as representing the letter "A". The carpet is also seen to include a number of anomalous characters 27, which were evidently miscoded. The operator typically marks anomalous items 27 by clicking a mouse 40 on these items. Alternatively, the operator may use a pointing device of another type, such as a joystick, trackball or other devices known in the art. As is exemplified in FIG. 1, inset A, the operator has to identify and mark anomalous letters "o" that appear in the carpet of "A"s. For each field 24, there is typically a proximal "field done" button 33 on which he clicks his mouse 40 having identified and marked the anomalous character 27.

When the operator has corrected all the anomalous letters "o", he clicks mouse 40 either on one of "done" buttons 33 or a "done" button 31 at the bottom of the screen. This is indicative that all of the characters on the screen have been verified by operator 39. Alternatively, the operator may press an "enter" button on a keyboard 38. At this point the screen is considered to have been verified, with the exception of the marked anomalous items 27. By selecting a "done" button 33 that is adjacent to the last character 27 that he has marked, rather than selecting button 31 or pressing the "enter" key, the operator avoids a long traverse of mouse 40 and thus shortens the time needed to complete screen 42 and move on to the next one. The distance between at least one of the control buttons and any one of the data fields is preferably configured so as to optimize the tradeoff between throughput lost due to reducing the data area on screen, and throughput gained by reducing time spent by the operator on control actions. The anomalous items marked by the operator are sent for further processing.

Alternatively, as shown in the lower inset B, operator 39 may be required to verify and/or correct fields 24 comprising numerical characters 26 on a screen of numerical characters. The letter W in the string "3W0" stands out as being an anomalous item 27. In this case, the operator has to identify, mark and possibly correct anomalous item 27 "3W0". If there are no more anomalous items 27, he clicks mouse 40 on a "field done" button 33 or on "screen done" button 31 so as to show that all items on screen designated B have been verified, with the exception of "3W0".

Figure 2A:
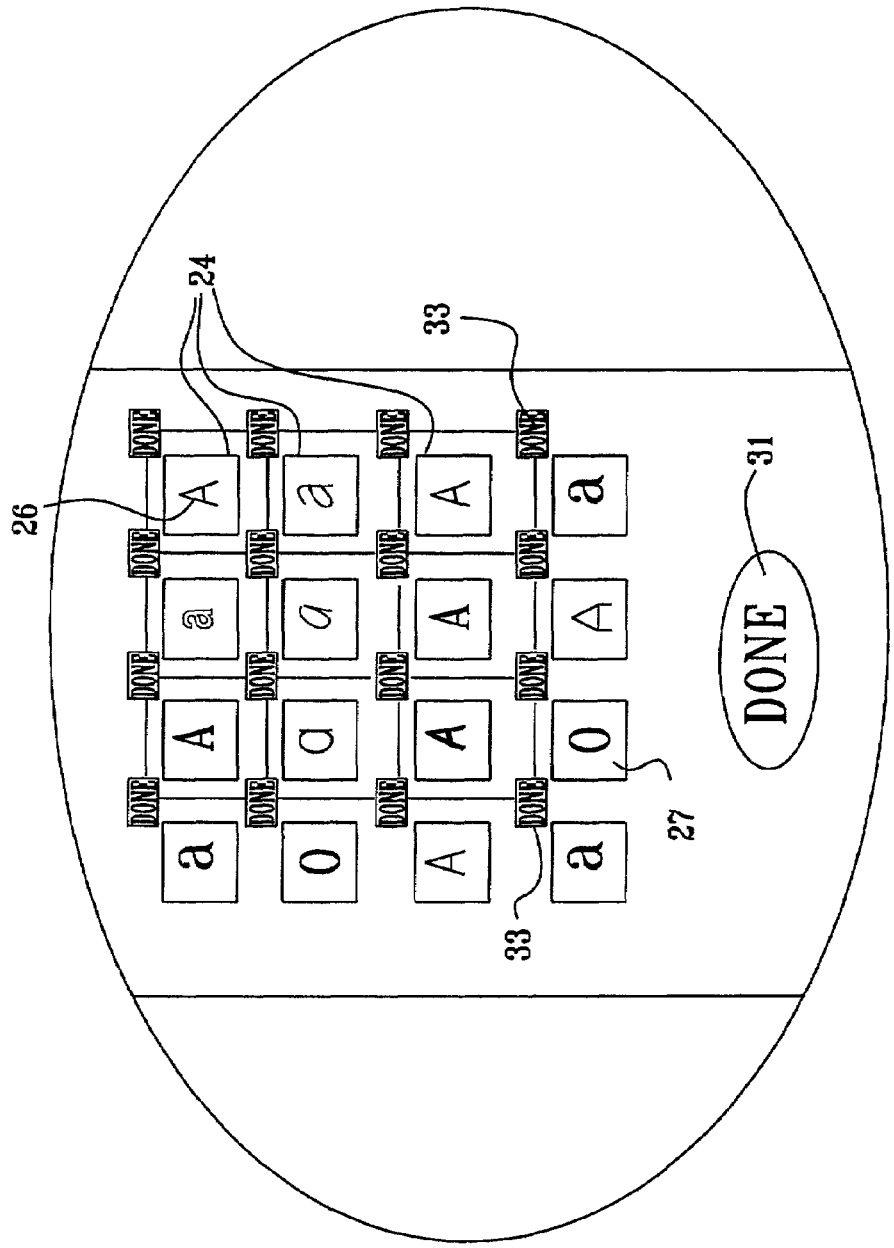
FIGS. 2A and 2B are simplified pictorial illustrations of a computer screen arranged for improved efficiency verification of coding of information, in accordance with a preferred embodiment of the present invention.
Figure 2B:
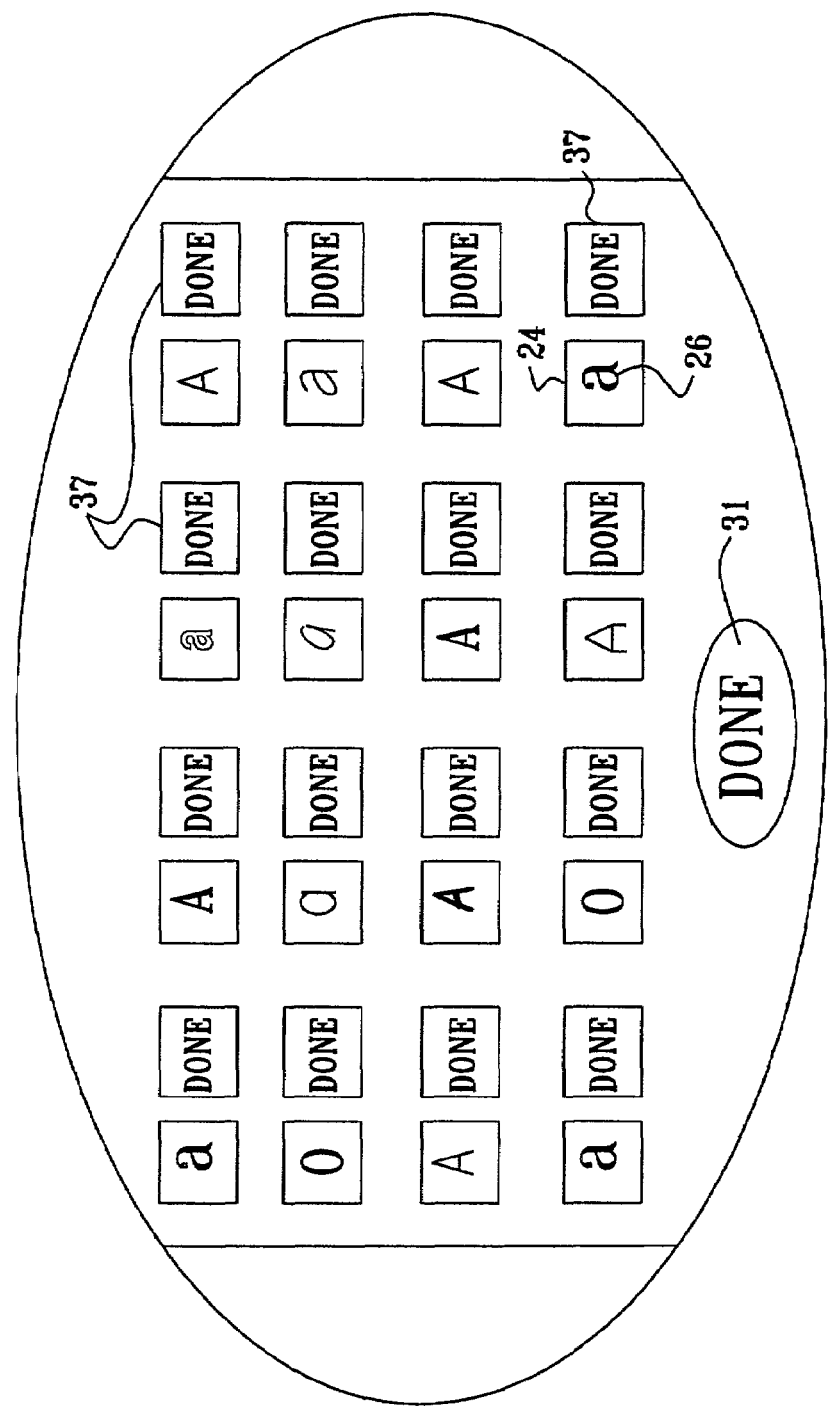

Reference is now made to FIGS. 2A and 2B, which are simplified pictorial illustrations of screen 42, arranged for verification of coding of information with improved efficiency, in accordance with a preferred embodiment of the present invention.

FIG. 2A shows a multiplicity of "done" buttons 33 proximal, but external to fields 24. These buttons 33 sit on a grid interspersed between fields 24. The grid may be arranged such that the buttons 33 are placed above and below, or in between fields 24.

FIG. 2B shows an alternative arrangement of "done" buttons, in which "done" buttons 37 are placed within some of fields 24. In this example, there is one "done" button 37 per field 24. This placement enables the operator to reach the nearest "done" button by a quick, simple left or right movement of mouse 40.

Although the embodiments of FIGS. 1 and 2A-2B described above relate specifically to verification of OCR results, the principles of the present invention can be applied to enhance the efficiency of a wide variety of computerized data entry functions. The inventor has found that by duplication and strategic placement of on-screen controls (without limitation to controls of a specific type, such as "done" buttons), it is possible to reduce the time that an operator spends on interaction with a given screen. This sort of strategic duplication is not known in the prior art. The strategic placement of on-screen buttons may be particularly useful in data entry systems, for manually inputting information to a computer. In such applications, the user may be required to select fields on screen with a mouse, and then enter data into the selected fields. "Enter" buttons may be strategically placed at multiple locations on the screen to indicate that the user is finished processing the fields in this screen.

Another application of on-screen buttons is in inspection systems. For example, in a food processing line, the tradename of a food product may appear thereupon. Quality control of the product typically comprises inspection of a large number of items simultaneously using a computerized magnification system, as is known in the art. The quality control inspector checks that the appearance of the trade-name is clear and legible on multiple items at a time. If the inspector finds an item with a defect in the appearance of the name, he points using pointing device (as in FIG. 1) to mark the item which is to be rejected from the product line, and then selects the nearest "done" button to indicate that the rest of the items are acceptable. Of course, such on-screen button systems can be applied to other types of inspection systems, such as manufacturing inspection systems for semiconductor chips, metal parts and the printing industry. Such systems can also be applied in medical diagnostics, wherein the operator might be required to view multiple cell images, for example, and to mark cells or other features belonging to a certain type or exhibiting some pathology.

Another exemplary application of the present invention is in the area of process or system control. In this case, the screen might contain multiple graphic illustrations or images, each indicative of the status or dynamics of a given process. The operator is required to mark processes that need special attention. A process in this sense may be a network activity, for example, and special attention may be required when the activity indicates a possible security problem. A single screen may be used in this manner for dynamic monitoring of multiple networks at once.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for increasing efficiency of interaction by an operator with data on a computer display, comprising:
   presenting the data to the operator in a plurality of data fields on the computer display;
   placing multiple redundant instances of an on-screen control at different locations on the display in proximity to different ones of the fields for selection by the operator using a pointing device linked to the display; and
   actuating the control responsive to the selection by the operator of any of the instances of the control on the display.

2. A method according to claim 1, and wherein actuating the control comprises receiving an input from the operator to indicate that the data are verified.

3. A method according to claim 2, wherein presenting the data comprises presenting results of optical character recognition (OCR) for verification by the operator.

4. A method according to claim 1, wherein the multiple redundant instances of the on-screen control all indicate that the operator has finished processing the data in the plurality of the fields.

5. A method according to claim 1, wherein placing the instances comprises interspersing the instances of the control between the data fields.

6. A method according to claim 1, wherein providing the multiple instances comprises choosing the locations so as to minimize a traverse of the pointing device required to select one of the instances.

7. A method according to claim 1, wherein presenting the data comprises displaying in the fields characters from a document to which codes have been assigned so that the operator can verify that the assigned codes are correct.

8. A method according to claim 7, wherein displaying the characters comprises displaying results of optical character recognition (OCR) processing.

9. A method according to claim 8, wherein displaying the results comprises displaying together a plurality of the characters which have been assigned the same code by the OCR processing, with one of the characters in each of the fields.

10. A method according to claim 1, wherein providing the multiple instances comprises providing three or more instances of the control on screen.

11. Apparatus for operator interaction with a computer, comprising:
    a display, arranged to present data to an operator;
    a processor, coupled to drive the display to present the data in a plurality of data fields on the display together with multiple redundant instances of an on-screen control placed in proximity to different ones of the fields at different locations on the display; and
    a pointing device, coupled to the processor so as to enable the operator to select for actuation any of the instances of the on-screen control by the operator.

12. Apparatus according to claim 11, wherein selection of any of the instances of the on-screen control indicates that the data are verified.

13. Apparatus according to claim 12, wherein the data comprise results of optical character recognition (OCR) for verification by the operator.

14. Apparatus according to claim 11, wherein the multiple redundant instances of the on-screen control all indicate that the operator has finished processing the data in the plurality of the fields.

15. Apparatus according to claim 11, wherein the instances of the control are interspersed between the data fields.

16. Apparatus according to claim 11, wherein the locations of the multiple instances are chosen so as to minimize a traverse of the pointing device required to select one of the instances.

17. Apparatus according to claim 11, wherein the data in the fields comprise characters from a document to which codes have been assigned so that the operator can verify that the assigned codes are correct.

18. Apparatus according to claim 17, wherein the codes are assigned to the characters by optical character recognition (OCR) processing.

19. Apparatus according to claim 18, wherein a plurality of the characters which have been assigned the same code by the OCR processing are displayed together, with one of the characters in each of the fields.

20. Apparatus according to claim 11, wherein the multiple instances comprise three or more instances of the control on screen.

21. A computer software product for increasing efficiency of interaction of an operator with data on a computer display, comprising a computer-readable medium in which program instructions are stored, which instructions, when read by a computer, cause the computer to present the data to the operator in a plurality of data fields on the computer display while providing multiple redundant instances of an on-screen control placed in proximity to different ones of the fields at different locations on the display for selection by the operator using a pointing device linked to the display, and to actuate the control responsive to the selection by the operator of any of the instances of the control on the display.

22. A product according to claim 21, wherein selection of any of the instances of the on-screen control indicates that the data are verified.

23. A product according to claim 22, wherein the data comprise results of optical character recognition (OCR) for verification by the operator.

24. A product according to claim 21, wherein the multiple redundant instances of the on-screen control all indicate that the operator has finished processing the data in the plurality of the fields.

25. A product according to claim 21, wherein the instances of the control are interspersed between the data fields.

26. A product according to claim 21, wherein the locations of the multiple instances are chosen so as to minimize a traverse of the pointing device required to select one of the instances.

27. A product according to claim 21, wherein the data in the fields comprise characters from a document to which codes have been assigned so that the operator can verify that the assigned codes are correct.

28. A product according to claim 27, wherein the codes are assigned to the characters by optical character recognition (OCR) processing.

29. A product according to claim 28, wherein a plurality of the characters which have been assigned the same code by the OCR processing are displayed together, with one of the characters in each of the fields.

30. A product according to claim 21, wherein the multiple instances comprise three or more instances of the control on screen.

\* \* \* \* \*